US012720205B2

(12) United States Patent
Schmeissing et al.

(10) Patent No.: US 12,720,205 B2
(45) Date of Patent: Aug. 25, 2026

(54) AUTOMATED AERIAL THREAT PRIORITIZATION

(71) Applicant: Dedrone Holdings, Inc., Sterling, VA (US)

(72) Inventors: Jörn Schmeissing, Kassel (DE); Florian Hoidn, Kassel (DE); Daniel Kostiw, Sterling, VA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 18/658,116

(22) Filed: May 8, 2024

(65) Prior Publication Data

US 2025/0350839 A1 Nov. 13, 2025

(51) Int. Cl.

*H04N 23/695* (2023.01)
*G06V 10/764* (2022.01)
*G06V 10/82* (2022.01)
*G06V 10/98* (2022.01)
*G06V 20/52* (2022.01)
*H04N 7/18* (2006.01)
*H04N 23/61* (2023.01)
*H04N 23/69* (2023.01)

(52) U.S. Cl.

CPC ......... *H04N 23/695* (2023.01); *G06V 10/764* (2022.01); *G06V 10/82* (2022.01); *G06V 10/98* (2022.01); *G06V 20/52* (2022.01); *H04N 7/183* (2013.01); *H04N 23/61* (2023.01); *H04N 23/69* (2023.01)

(58) Field of Classification Search

CPC ...... H04N 23/695; H04N 7/183; H04N 23/61; H04N 23/69; G06V 10/764; G06V 10/82; G06V 10/98; G06V 20/52

See application file for complete search history.

(56) References Cited

U.S. PATENT DOCUMENTS

2018/0284785 A1* 10/2018 Berntorp .................. G06N 3/08
2018/0307910 A1* 10/2018 Zimerman .............. G06T 7/251
2020/0202144 A1* 6/2020 Porter .................... G06V 20/58
2023/0033533 A1* 2/2023 Kaniyala ................. G06T 7/251

OTHER PUBLICATIONS

Luo (NPL "Threat Assessment Method of Low Altitude Slow Small Targets Based on Information Entropy and AHP," Entropy 2021) (Year: 2021).*

* cited by examiner

*Primary Examiner* — Shadan E Haghani
(74) *Attorney, Agent, or Firm* — Bradley Arant Boult Cummings LLP; Daniel E. Sineway, Esq.; Adam J. Thompson. , Esq.

(57) ABSTRACT

Aspects of the present disclosure generally relate to systems and processes for classifying objects in an airspace. The system may include a memory and at least one computing device in communication with the memory. The computing device may receive data corresponding to tracks of identified objects in an airspace from a RADAR system. The computing device may generate a set of prioritization scores for each track. The computing device may generate aggregate prioritization scores based on the individual prioritization scores. The system may adjust the positioning of a pan-tilt-zoom camera based on the aggregate prioritization scores.

20 Claims, 5 Drawing Sheets

AUTOMATED AERIAL THREAT PRIORITIZATION

TECHNICAL FIELD

The present systems and processes generally relate to automated classification and prioritization of unidentified aerial threats and more specifically to the integration of advanced sensing technologies (e.g., RADAR and pan-tilt-zoom cameras coupled with sophisticated machine learning and artificial intelligence algorithms) to dynamically assess and manage threats in real-time within secured airspaces.

BACKGROUND

Maintaining security in airspace is crucial due to the increasing use of aerial devices such as drones and other aircraft which can pose threats to public safety, privacy, and national security. Airspaces above airports, critical infrastructures, or urban areas are particularly sensitive zones where unauthorized or unidentified aerial objects can lead to significant risks, including collisions, espionage, and terrorist attacks. Conventional surveillance resources are often limited by the coverage capacity of existing equipment, such as cameras and RADAR systems, which may not encompass a wide enough area or may lack the resolution to accurately identify and track distant objects. Furthermore, manual monitoring processes depend heavily on human operators, who may face challenges like fatigue and cognitive overload, leading to slower response times and potential oversight of critical threats. There is therefore a long felt and pressing need for automated systems that can prioritize and respond to potential aerial threats efficiently without the delays and limitations of human intervention.

BRIEF SUMMARY OF THE DISCLOSURE

Briefly described, and according to one embodiment, aspects of the present disclosure generally relate to systems and processes for assessing the threat level of identified objects in an airspace. According to various aspects of the present disclosure, a threat assessment environment may include one or more RADAR systems and one or more pan-tilt-zoom (PTZ) cameras. The RADAR systems may identify objects in an airspace and provide information as to their current locations and trajectories. A computing device may apply various machine learning and artificial intelligence (AI) models to the RADAR data to determine a prioritization score for each object in the air space. The computing device, utilizing the prioritization scores, may orchestrate allocation of camera resources to enhance surveillance efficiency, directing the one or more PTZ cameras towards objects posing the greatest threat based on real-time threat assessments. The threat assessment environment may repeat this process over time to provide real time information and image data corresponding to the most important objects in the airspace.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
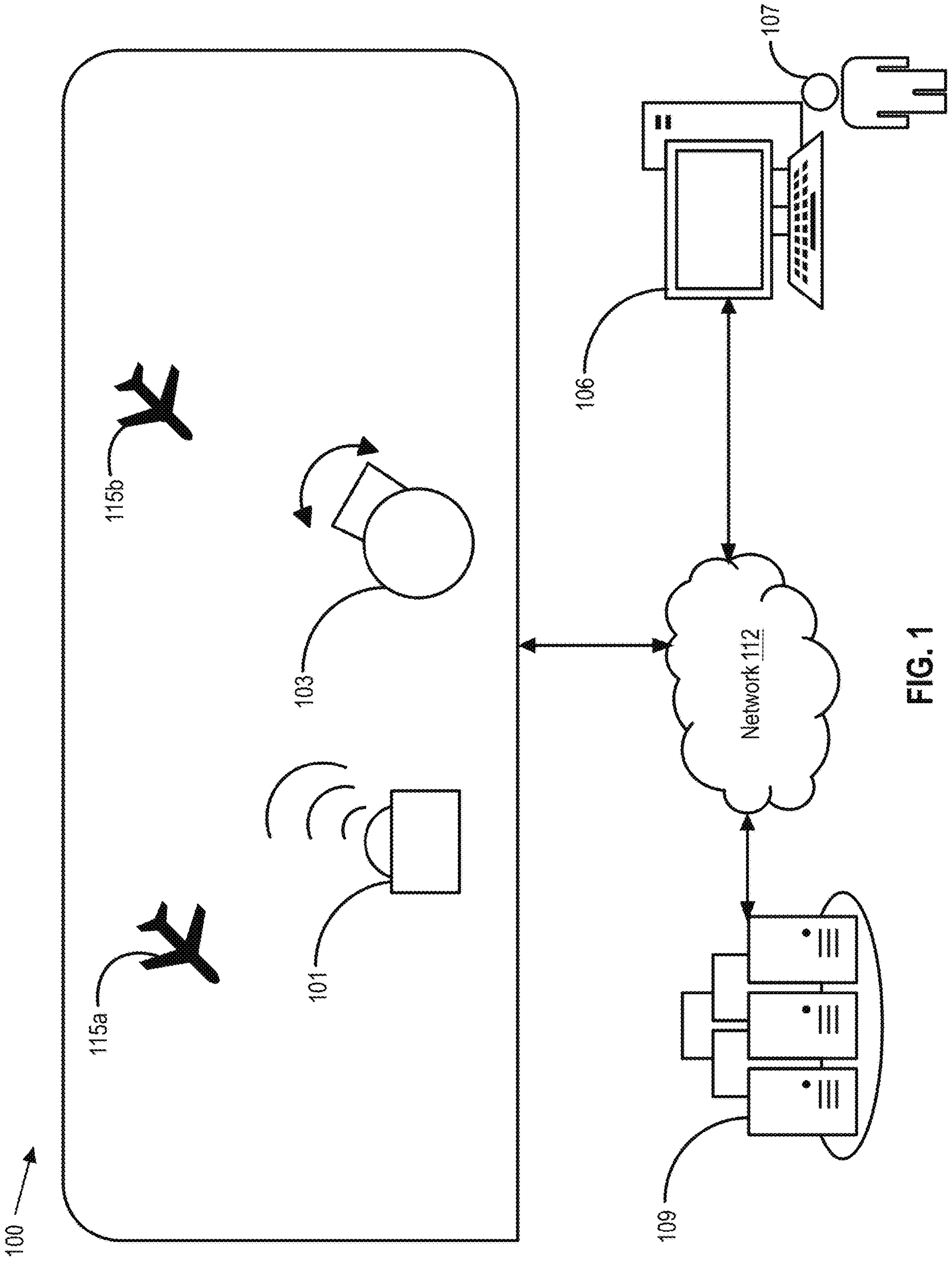
FIG. 1 illustrates an aerial threat assessment environment according to various aspects of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Referring now to FIG. 1, shown is an illustrative aerial threat assessment system 100 according to various aspects of the present disclosure. According to some aspects, the aerial threat assessment system 100 may efficiently monitor and secure large airspaces which are often inadequately covered by traditional surveillance systems. The aerial threat assessment system 100 may incorporate advanced electromagnetic devices (e.g., RADAR, LiDAR, SONAR, or PIR) capable of scanning and detecting aerial objects over wide areas. These devices way operate with emitters and detectors to process electromagnetic radiation reflected from objects, facilitating precise localization and movement tracking. Moreover, the aerial threat assessment system 100 may enhance the functionality of surveillance by integrating these electromagnetic devices with machine learning and/or artificial intelligence models. The machine learning and/or artificial intelligence models may utilize the collected data to assess threats and prioritize objects based on their detected characteristics and behaviors. This threat assessment and prioritization of objects may allow for dynamic allocation of surveillance resources, e.g., focusing on high-risk objects more efficiently than manual monitoring methods could achieve. The aerial threat assessment system 100 may further address limitations of physical coverage associated with conventional systems by overlapping fields of view from multiple electromagnetic devices. For example, the aerial threat assessment system 100 may ensure comprehensive coverage without blind spots, even in extensive and complex airspace environments. By optimizing the deployment of surveillance assets in real-time, the aerial threat assessment system 100 may mitigate the risks posed by unidentified aerial objects, offering a robust technical solution to contemporary security challenges in aerial surveillance.

According to some aspects, the aerial threat assessment system 100 may include one or more electromagnetic devices 101. The electromagnetic device 101 may be a RADAR device, a LiDAR device, or other suitable electromagnetic object detection device. Other suitable electromagnetic devices (e.g., electromagnetic device 101) may include SONAR (Sound Navigation and Ranging) and passive infrared (PIR) sensors. SONAR devices, though typically used underwater, may be adapted for aerial use to detect objects through acoustic waves. The SONAR devices may emit sound pulses and measure the echo to determine distance and direction of objects, which may be beneficial in environments where electromagnetic interference is an issue. PIR sensors, commonly used in motion detection, may be adapted for aerial surveillance to detect heat signatures from objects in an airspace. The PIR sensors may be effective in identifying thermal anomalies from mechanical or live entities, providing a different layer of security by highlighting unusual heat patterns.

Each device type of the electromagnetic devices 101 may operate on different principles, which may be strategically combined to enhance detection accuracy. For example, while RADAR uses radio waves to determine the distance and speed of objects, LiDAR provides higher resolution images by using laser beams, which may provide precise spatial analysis in crowded airspaces. SONAR may offer depth detection in obscured conditions, and PIR may add another layer by monitoring thermal signatures, thereby enhancing capabilities to operate under various environmental constraints. These combined technologies may provide comprehensive coverage to enhance airspace security, especially in sensitive or strategically significant areas.

The electromagnetic device 101 may comprise an emitter and a detector that work together to monitor airspace activity. The emitter may transmit electromagnetic radiation that reflects off objects within its range, and these reflections may be received by the detector. This interaction may facilitate precise detection and tracking of objects by analyzing the characteristics of the reflected waves, such as their amplitude, frequency, and phase changes.

The electromagnetic device 101 may emit electromagnetic waves across a spectrum of wavelengths tailored to specific surveillance needs, allowing the aerial threat assessment system 100 to operate efficiently under various environmental conditions and detection requirements. By adjusting the wavelength band (e.g., ranging from very narrow to broad) the electromagnetic device 101 may enhance its sensitivity to smaller objects or extend its range to detect objects at greater distances. This adaptability may be utilized for effective monitoring of diverse airspace scenarios, from densely populated urban airspaces to expansive rural areas. Furthermore, the selection of wavelengths associated with the electromagnetic device 101 way be strategically based on several operational parameters, such as the size of the objects to be detected and their expected distances. For instance, shorter wavelengths may be used to detect small, fine details of objects close to the electromagnetic device 101, while longer wavelengths may be used for detecting larger objects or those located farther away. These variable wavelengths may ensure that the electromagnetic device 101 maintains high accuracy and effectiveness within the aerial threat assessment system 100, adapting performance to meet the specific demands of the airspace being monitored.

The electromagnetic devices 101 may comprise multiple emitters and detectors to enhance the system's capability to monitor extensive airspaces. Moreover, the one or more of the electromagnetic devices 101 may be steered (e.g., changing a field of view of one or more of the electromagnetic devices 101), enabling precise scanning of specific airspaces of interest and adapting in real-time to focus on areas with detected activities or potential threats. To ensure comprehensive coverage, multiple electromagnetic devices 101 may be strategically positioned to scan different segments of a vast airspace. By configuring each electromagnetic device 101 to cover distinct areas, their fields of view may overlap, effectively creating a seamless surveillance blanket over the entire monitored region. This configuration may minimize gaps in coverage and ensure that all movements within the airspace are continuously monitored, providing a robust setup for threat detection and airspace security.

According to some aspects, the overlapping fields of view among the multiple electromagnetic devices 101 may improve accuracy and reliability of the data collected. When areas are monitored by more than one device, the data may be cross-verified, reducing false positives and increasing precision of object detection and tracking. This layered approach to surveillance may allow for a more detailed analysis of the airspace, supporting better decision-making in the deployment of additional security measures or responses to aerial threats.

The aerial threat assessment system 100 may include one or more camera(s) 103. The camera(s) 103 may be charge coupled device (CCD) cameras, infrared cameras, digital cameras, or other suitable camera devices, enhancing its ability to monitor and identify objects across different conditions and distances. The camera(s) 103 may be mounted on a pan-tilt zoom platform, enabling dynamic positioning and focus adjustment to cover specific areas of interest within the airspace. This flexibility may allow the camera(s) 103 to quickly adapt and respond to the movements of detected objects, providing real-time surveillance capabilities. The camera(s) 103 may include zoom functionality to allow them to zoom in or out for a particular object of interest, whether they are aircraft, drones, or other airborne entities. For instance, if a camera detects an unusual object moving through a monitored airspace, it may zoom in to capture detailed imagery, aiding in the classification and response planning. This capability may be beneficial for security, especially in sensitive zones where the identification of unauthorized objects may prevent potential threats.

The camera(s) 103 may utilize specialized control software to allow them to track objects along a specific bearing. For example, camera(s) 103 may lock onto a particular aircraft in an airspace, zoom in to capture a detailed view of the object, and track the object as it moves along a bearing. The camera(s) 103 may scan a portion of airspace at regular intervals to help in the identification of objects in the airspace. The surveillance feed may be systematically updated, and continuous monitoring may be ensured by enhancing the tracking with the ability to scan designated airspaces at set intervals, allowing the aerial threat assessment system 100 to maintain situational awareness and ensure that all objects within the airspace are accounted for and assessed appropriately.

The aerial threat assessment system 100 may include a computing device 106. In some aspects, the computing device 106 may be operated by a user 107. The computing device 106 may function as the control system for the aerial threat assessment system 100. The computing device 106 may be implemented in various forms to suit different operational needs and environments. An example may include a server that manages data processing and system operations centrally, e.g., located in a control center or data facility. In another example, the computing device 106 may be a workstation that provides processing capability required for real-time analysis and visualization of data from the sensors and/or cameras. Moreover, the computing device 106 may comprise cloud computing platforms, e.g., including scalable resources to handle data processing and storage and allowing for dynamic adjustment to computational needs. Additionally, computing device 106 may include one or more mobile devices, such as tablets or specialized handheld devices, to enable immediate decision-making and system monitoring from various locations. Each format of the computing device 106 may comprise any necessary software and hardware capabilities to ensure efficient data integration, real-time processing, and reliable communication within the aerial threat assessment system 100.

The computing device 106 may include control software and circuitry for receiving data from the electromagnetic device 101. The computing device 106 may include software for identifying and localizing aerial objects 115 based on received data from the electromagnetic device. The software for identifying and localizing aerial objects 115 may analyze electromagnetic signatures collected by the electromagnetic device 101. Detected signatures may be compared with a database of known profiles, allowing the aerial threat assessment system 100 to classify different types of aerial objects 115 (e.g., commercial aircraft, drones, or other unidentified flying objects). Furthermore, the localization of aerial objects by the computing device 106 may include a determination of their positions within the monitored airspace. The position may be determined by analyzing time delay and frequency shift in the electromagnetic waves returned to the electromagnetic device 101 after they bounce off an object. The time delay and frequency shift may be used to calculate a distance and/or a trajectory of each object and facilitating real-time tracking. By continuously updating the database with new signatures and adjusting the detection algorithms, the computing device 106 may enhance its predictive capabilities and improve the accuracy of object identification and localization.

The computing device 106 may include control software and circuitry for communicating with the camera(s) 103. For example, the computing device 106 may receive the location of an object identified by the electromagnetic device 101 and control the pan-tilt-zoom (PTZ) system of a camera to direct it towards the identified aerial object 115. The computing device 106 may further include software for classifying objects based on captured image data. For example, the computing device 106 may include image classification software for determining whether an identified aerial object 115 is a bird, an airplane, a drone, or other type of flying object.

For example, the computing device 106 may access a database of classified images comprising an array of aerial objects captured under various conditions. Each stored image may be tagged with metadata describing its visual characteristics and type. When a new image is captured by the camera(s) 103, visual data associated with the new image may be compared against images of the database using feature matching techniques. The comparison may utilize one or more algorithms, e.g., Scale-Invariant Feature Transform (SIFT) or Speeded Up Robust Features (SURF), to identify objects despite changes in image scale, noise, illumination, and three-dimensional viewpoint.

Moreover, the aerial threat assessment system 100 may utilize convolutional neural networks (CNNs) for object classification. The CNNs may process visual imagery, automatically detecting intricate patterns that may not be distinctly apparent to human observers. By training the CNNs with a substantial dataset of aerial images, the aerial threat assessment system 100 may discern characteristics that distinguish one type of aerial object from another (e.g., subtle differences in shape, size, and texture). For example, the CNN may identify commercial aircraft by their specific fuselage shapes and wing configurations. This automated, real-time analysis may enable the aerial threat assessment system 100 to rapidly classify objects with high accuracy, facilitating swift decision-making in dynamic airspace environments.

The aerial threat assessment system 100 may include a remote server 109. The remote server 109 may function to store threat assessment data. The remote server 109 may include a database of historical threat assessment data. The remote server 109 may include software which updates threat assessment algorithms based on historical threat assessment data. While various functionality is described herein as being performed by the remote server 109, computing device 106, and/or the sensor array 209, it is appreciated that this functionality may be performed in coordination with or solely by the remote server 109, computing device 106, and/or the sensor array 209.

The remote server 109 in the aerial threat assessment system 100 may utilize one or more machine learning models to enhance threat assessment capabilities. By analyzing historical threat assessment data (e.g., stored in a database), the remote server 109 may refine and update its models to predict and identify potential threats with greater accuracy. Machine learning models such as neural networks or decision trees may learn from past incidents, adjusting parameters and improving their predictive capabilities over time, e.g., making the system more effective in real-world scenarios. Additionally, the remote server 109 may utilize advanced data analytics tools to process and interpret vast amounts of data collected by the sensor array 209 and other components of the aerial threat assessment system 100. One or more of the data analytics tools may detect patterns and anomalies in the data that may indicate potential threats. For example, anomaly detection algorithms may identify unusual flight patterns or radar signatures that deviate from known safe parameters, flagging these for further investigation by security personnel. The remote server 109 may regularly update its threat assessment algorithms based on new data and emerging trends to ensure effectiveness against evolving threats. This continuous learning process may allow the aerial threat assessment system 100 to adapt to new tactics used by malicious entities, ensuring that the aerial threat assessment system 100 remains at the forefront of airspace security technology. These updates may maintain the integrity and reliability of the aerial threat assessment system 100, providing a robust defense mechanism against potential aerial threats.

The electromagnetic devices 101, the camera(s) 103, the computing device 106, and the remote server 109 may be communicably coupled to each other by a network 112. The network 112 may be a local area network, a wireless network, the internet, or any other suitable network. The network 112 may provide seamless data transmission and real-time communication between the various components. According to some aspects, a local area network (LAN) may be associated with a specific airport or local airspace, facilitating fast and secure communication over short distances. For broader coverage, such as across multiple airports or an entire flight region, the network 112 may include a wireless network or satellite communications to ensure continuous connectivity (e.g., regardless of geographical boundaries). Additionally, the network 112 may communicate with the internet, including incorporation of one or more cloud computing resources, to enable data processing and/or storage capabilities, such as access to real-time weather updates and global traffic information.

Figure 2:
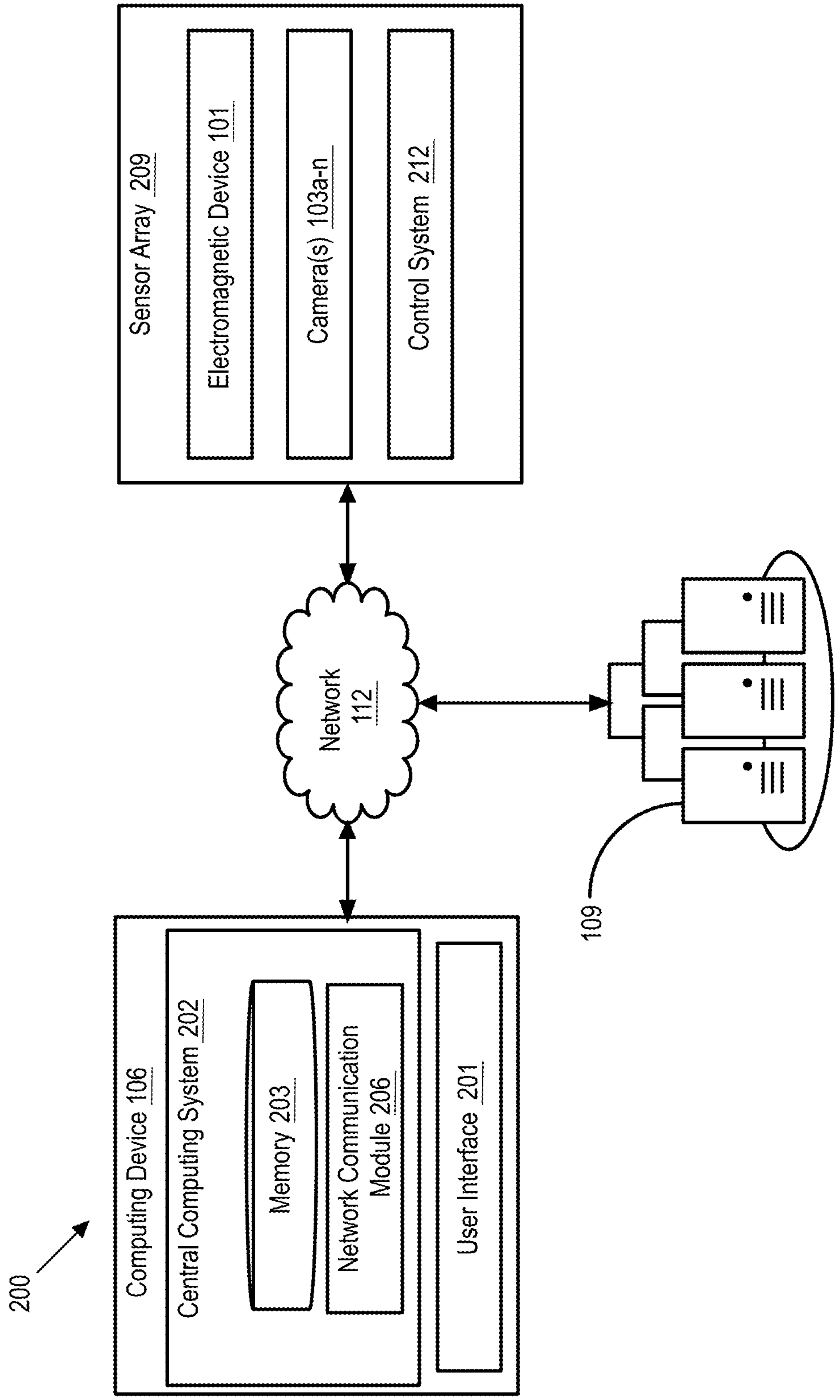
FIG. 2 illustrates an exemplary networked environment according to various aspects of the present disclosure.

Referring now to FIG. 2, shown is an exemplary networked environment 200 for the automated aerial threat assessment system 100 according to various aspects of the present disclosure. The networked environment 200 may include a computing device 106. The computing device 106 may provide an interface for users 107 and the aerial threat assessment system 100.

The computing device 106 may include a central computing system 202. The central computing system 202 may correspond to the control system for the computing device 106. The central computing system 202 may include specialized software for interacting with the remote server 109 and the sensor array 209. The central computing system 202 may include software which carries out processes 300 and 400 (described in detail below in reference to FIG. 3 and FIG. 4). The central computing system 202 may further provide the user with real-time updates as to identified objects and threat levels.

The computing device 106 may include a memory 203. The memory 203 may function as a high-speed storage device, a short-term storage device (e.g., Random Access Memory (RAM)), a long-term storage device, and/or any particular combination thereof. The memory 203, for example, may store image data, object location data, electromagnetic data, and other data necessary for the functioning of the aerial threat assessment system 100.

The computing device 106 may include a network communication module 206. The network communication module 206 may function as a data distribution source for the one or more computing devices 106. For example, the network communication module 206 may send data to one or more locations distributed across the network 112. In another example, the network communication module 206 may receive data from any particular location distributed across the network 112.

The computing device 106 may include a user interface 201. The user interface 201 may be a tablet, a computer monitor, or other suitable display. The computing device 106 may render the user interface 201 to include a visual representation of identified aerial objects 115 ranked according to a calculated threat score. The user interface 201 may include symbols which correspond to specific types of aerial objects 115 and specific threat levels. For example, computing device 106 may generate the user interface 201 to include a symbol which specifically represents living objects, such as birds, another symbol which represents manned aircraft, and another symbol that represents unmanned aircraft. The user interface 201 may include symbols to indicate a determined threat level of an identified object. For example, the computing device 106 may render symbols in different colors on the user interface 201 depending on the threat level of an object. In one embodiment, the computing device 106 may render symbols associated with high threat objects in one color (e.g., red) and symbols associated with low threat objects in a different color (e.g., green) on the user interface 201. As the computing device 106 identifies new data about one or more objects, the computing device 106 may update the user interface 201 according to that new data. As an example, the computing device 106 may determine an unverified object is an unmanned aircraft and update the user interface 201 by changing the symbol for the previously unverified object to that assigned to an unmanned aircraft. As another example, the computing device 106 may calculate a different threat level (e.g., higher or lower) for an object based on analyzing a pattern associated with the flight of that object. The computing device 106 may update the user interface 201 to modify a color of a symbol representing that object in response to changing the threat level.

The networked environment 200 may include a sensor array 209. The sensor array 209 may function as the data collection apparatus for the aerial threat assessment system 100. The sensor array 209 may include one or more sensors of multiple types. The sensor array 209 may include electromagnetic devices 101, camera(s) 103, and additional sensors for characterizing the airspace of interest. For example, the sensor array 209 may include temperature sensors, wind sensors, precipitation sensors, and other sensors suitable for providing information about the airspace.

The sensor array 209 may include one or more electromagnetic devices 101. The electromagnetic devices 101 may include one or more RADAR devices, one or more LIDAR devices, or any other combination of suitable electromagnetic devices. The electromagnetic devices 101 may include radio frequency antennas. The electromagnetic devices 101 may be fixed such that they scan a particular airspace or steerable, such as by the control system 212 or by the computing device 106. The electromagnetic devices 101 may operate in a narrowband frequency tuned to the size of objects likely to be identified in the airspace. The electromagnetic devices 101 may include one or more processors and memories for executing software. The electromagnetic devices 101 may identify objects and trajectories of objects in the airspace. The electromagnetic devices 101 may analyze radio frequency signals in the airspace and/or capture the radio frequency signals for analysis by the control system 212.

The sensor array 209 may communicate the signal data to the computing system 202. The computing system 202/sensor array 209 may analyze the radio frequency signals to determine a band associated with the signals. The computing system 202/sensor array 209 may analyze the radio frequency signals to determine a protocol being used by one or more objects in the airspace. The computing system 202/sensor array 209 may analyze communications embedded within the signal, such as, for example, commands sent using the identified protocol. For example, the computing system 202/sensor array 209 may determine one or more instructions and/or replies sent to or from a UAV within the airspace. The computing system 202/sensor array 209 may analyze the instructions/replies to determine instructed operations of the UAV currently with the UAV and/or before the UAV performs the instructed operations.

The sensor array 209 may include one or more camera(s) 103. The camera(s) 103 may be mounted on a PTZ platform to facilitate software-instructed movement of the lens to point at a particular portion of the airspace. The camera(s) 103 may be configured with specialized software for following moving objects along a bearing. The sensor array 209 and/or computing system 202 may analyze a feed from the camera to identify movement. The sensor array 209 and/or computing system 202 may cause one or more camera 103 to follow an identified moving object along a bearing. The camera(s) 103 may be communicably coupled to a computing device 106 and/or a remote server 109 via the network 112. The computing device 106 may render captured image data in real-time to be viewed by a user 107.

The sensor array 209 may include a control system 212. The control system 212 may function to integrate data from all sensors in the sensor array 209. The control system 212 may further control the direction of the one or more camera(s) 103 and the functioning of the electromagnetic device 101. The control system 212 may function to aggregate data from all sensors in the sensor array and communicate it to the computing device 106 and/or the remote server 109 or any other location on the network 112. For example, the control system 212 of the sensor array 209 may transmit RADAR and image data across the network 112 in packets at regular intervals such that the networked environment is constantly furnished with up-to-date data from all sensors.

The networked environment 200 may include a remote server 109. The remote server 109 may include a centralized data center for the networked environment. The remote server 109 may include a historical database of identified objects, trajectories, behavior patterns, and prioritization scores. The remote server 109 may include machine learning models and artificial intelligence algorithms for classifying data received from the sensor array. The remote server 109 may generate and communicate analysis and classification of identified aerial objects 115. The remote server 109 may send the analysis and classification of the identified aerial object 115 to one or more computing devices 106 via the network 112. In some aspects, the remote server 109, the computing device 106, and the sensor array 209 may all be communicably coupled by the network 112, such that data may flow among the locations and other location on the network.

In an exemplary embodiment, the computing device 106 may receive data from the electromagnetic device 101. For example, a RADAR device may transmit RADAR data to the computing device 106 via the network 112. The RADAR device may transmit data corresponding to a set of one or more objects identified in the airspace. The data corresponding to the set of objects may include metadata about each object in the set of objects. For example, the data may include the location of each identified object, the size of each identified object, the movement of each identified object, and other relevant data. Data related to the movement of an identified object may include an identified track of the object. The track may trace out the trajectory of the object in aerial space such that the computing device may identify behavioral patterns of the identified object. The computing device 106 may receive multiple tracks from the RADAR system corresponding to the motion of one or more identified aerial objects 115 moving in a particular airspace. Data associated with the tracks may include a variety of machine learning metadata, including date and timestamps, location data, and other relevant metadata.

The computing device 106 and/or the remote server 109 may generate a set of prioritization scores for each track corresponding to an estimated threat level for an identified object. The set of prioritization scores may be generated based on the received track data. The computing device 106 and/or the remote server 109 may generate the prioritization scores based on one or more machine learning algorithms. For example, the remote server 109 and/or the computing device 106 may apply one or more of a random forest classification algorithm, a linear regression model, a neural network, and other suitable machine learning model or combination thereof to generate a set of independent prioritization scores. The independent prioritization scores may correspond to a variety of different types of threats. For example, one machine learning algorithm may classify threat level based on the speed of an object, while another machine learning algorithm may classify threat level based on the altitude, distance, size, or other feature of the object.

The generation of prioritization scores by the computing device 106 or the remote server 109 may comprise one or more machine learning models to effectively assess and categorize the threat level of each tracked object. The one or more machine leaning models may analyze data received from sensors (e.g., the electromagnetic devices 101) and/or cameras (e.g., camera(s) 103), focusing on different attributes of the objects detected. For example, speed and altitude data may be used to predict potential security threats and assess whether an object's trajectory could intersect with designated no-fly zones or restricted areas. Each attribute may be associated with a model tailored specifically for its analysis. For example, the speed of an object may be analyzed through a random forest model that considers historical data on how speed correlates with threat levels, while altitude may be assessed using a neural network that predicts whether an object is likely to descend into protected airspace. Each of these models may be constantly updated with new data, enhancing their accuracy and reliability in real-time threat assessment.

To synthesize these analyses into a single, actionable score, the computing device 106 and/or the remote server 109 may employ a sophisticated method of integration where the outputs from different models are weighted according to their relevance to the current security context. This integration may prioritize altitude data over speed in scenarios where vertical proximity to critical infrastructure poses a greater risk than horizontal movement. Such a weighted approach may allow for dynamic adjustment of sensitivity to various threat indicators based on ongoing assessments and evolving security needs.

Furthermore, the computing device 106 and/or the remote server 109 may update and refine the models to ensure adaptability to new threats and changing conditions in airspace activity. For instance, if a new type of aerial vehicle begins to populate the airspace, the computing device 106 and/or the remote server 109 may quickly learn from these encounters to adjust its models accordingly, ensuring that the prioritization scores remain reflective of the actual risk posed by each object detected. This continuous learning process may allow the computing device 106 and/or the remote server 109 to maintain an effective aerial threat assessment system 100 that responds swiftly and accurately to prevent potential incidents.

The computing device 106 and/or the remote server 109 may generate an aggregate prioritization score for each track and identified object. For example, the computing device 106 and/or the remote server 109 may compute a weighted sum or average of the individual prioritization scores from the multiple machine learning algorithms. The weighting of different prioritization scores may be adjusted based on the expected types of threats in the area, past information about the accuracy of threat classification, user preferences, or other relevant information. The computing device 106 and/or the remote server 109 may select a particular set of prioritization scores from the total set of prioritization scores based on the relevance of specific factors in the particular application. For example, a prioritization score may be significant in some applications but not in others based on the speed of an object. In such cases, the computing device 106 and/or the remote server 109 may choose to include or exclude a particular prioritization score from the aggregate score.

The aggregate prioritization score generated by the computing device 106 or the remote server 109 may integrate data from various machine learning models, each tailored to assess different aspects of potential threats from aerial objects. This integration process may utilize a weighted sum or average approach, where each model's output, such as speed, size, altitude, or behavioral pattern, may be given a specific weight based on its importance to the current threat landscape. These weights may be adjusted dynamically to reflect changes in threat types, environment-specific risks, or user-defined security priorities, ensuring that the scoring system remains responsive to the most pertinent threats.

Furthermore, the computing device 106 or the remote server 109 may emphasize or deemphasize certain scores based on their relevance to specific operational needs. For example, in a high-security area where unauthorized access is a critical concern, the weight given to proximity-related scores may be increased. Conversely, in zones where aerial traffic is more common and diverse, speed or erratic movement may trigger higher concern, affecting how scores are aggregated. This adaptive scoring may be utilized to tailor response to varying security requirements, enhancing effectiveness and efficiency. The aggregate prioritization score may provide a crucial decision-making tool, guiding the deployment of response strategies and resource allocation. The computing device 106 or the remote server 109 may prioritize which objects to monitor closely, which to intercept, and which to be temporarily ignore, based on their calculated threat level. This prioritization may optimize the use of surveillance and interdiction resources and enhance overall airspace security by ensuring that the most significant threats are addressed promptly and effectively.

Upon receiving track data corresponding to an object, the computing device 106 and/or the remote server 109 may add the identified object to a prioritized list of objects in the airspace. The computing device 106 and/or the remote server 109 may continuously update the prioritized list based on some or all of the prioritization scores. When an object leaves the airspace (e.g., the electromagnetic device 101 stops detecting the object), the computing device 106 and/or the remote server 109 may remove the object from the prioritized list. The computing device 106 and/or the remote server 109 may update the order of prioritization based on recalculated prioritization scores as the electromagnetic device 101 provides more track data. The computing device 106 and/or the remote server 109 may assign camera resources to objects in the airspace based on the order of the prioritized list. For example, in a system that includes three camera(s) 103, the computing device 106 may assign each of the three cameras to the three objects with the highest prioritization scores. The camera(s) 103 may adjust their positioning and zoom in or out as needed to capture real-time video feeds of the high priority objects.

Upon receiving the track data, the computing device 106 or the remote server 109 may dynamically manage the deployment and operation of the camera(s) 103 based on the prioritized list of aerial objects. This prioritization may ensure that the camera(s) 103 may be focused on the most critical threats first. For example, camera(s) 103 may be programmed to automatically pan and zoom towards objects with higher prioritization scores, e.g., calculating optimal angles and zoom levels required to maintain the best possible surveillance coverage of these objects.

According to some aspects, adjustments to the camera(s) 103 may be proactive. As the threat level of an object changes, indicated by updates in its prioritization score due to new data from the electromagnetic device 101, the system may adjust the camera's focus either by zooming in for a closer look or zooming out to maintain a broader view. The adjustments may allow continuous monitoring without losing sight of the target, e.g., during high-speed pursuits or when tracking fast-moving objects. Moreover, assigning specific cameras to particular objects based on their threat level and position in the prioritized list may enhance resource utilization. In scenarios where multiple objects must be monitored simultaneously, the system may distribute the surveillance load across available cameras. Adjustment may be made automatically if a camera tracking a lower-priority object needs to be redeployed to a higher-priority one, ensuring that the most significant threats are always under the closest observation. This dynamic allocation of resources may maximize the effectiveness of the camera(s) 103, ensuring optimal coverage and threat response.

The computing device 106 and/or the remote server 109 may be configured to perform image analysis on image data received from the one or more camera(s) 103. For example, the computing device 106 and/or the remote server 109 may apply one or more machine learning algorithms to captured image data to determine a type of one or more of the identified objects in the field of view of the camera. The image data may correspond to video data, such as a series of images from a video feed from a camera. Types of objects may include, for example, an airplane, a helicopter, a drone, a bird, or no object (e.g., an object identified by the RADAR system, but not found in the view of the camera). The computing device 106 and/or the remote server 109 may re-orient cameras after objects have been classified. For example, after classifying the highest priority object as a low-threat level object, the computing device 106 and/or the remote server 109 may adjust the positioning of a camera such that it captures the next highest priority object. The process of iteratively adjusting camera positions to capture high priority objects, classifying captured objects, and moving to the object with the next highest prioritization score may repeat continuously. In some aspects, the computing device 106 and/or the remote server 109 may assign a high prioritization score to a previously classified object based on data received from the electromagnetic device. The computing device 106 and/or the remote server 109 may determine that the object is improperly classified based on updated track data. The computing device 106 and/or the remote server 109 may enhance the priority of deploying camera resources to re-classify the object. Based on the priority, the computing device 106 and/or the remote server 109 may redeploy camera resources towards that object such that it can be reclassified. The computing device 106 may initiate or terminate a process of reclassifying a previously identified object based on input from a user 107.

Image analysis performed on data received from the camera(s) 103 may extract meaningful information from the captured images. Raw image data may undergo preprocessing to enhance image quality and prepare it for analysis. Preprocessing may include steps such as normalization to adjust brightness and contrast, noise reduction to eliminate pixel-level distortions, and/or image sharpening to enhance edge definition. Following preprocessing, advanced computer vision and/or machine learning algorithms may be applied. For example, object detection algorithms, such as You Only Look Once (YOLO) or Region-based Convolutional Neural Networks (R-CNN), may be used to identify and classify different aerial objects within the images. The object detection algorithms may distinguish between various aircraft, birds, drones, or other objects based on their shapes, sizes, and textural features. Each identified object may be tracked across multiple frames to monitor its trajectory and behavior. This tracking may provide understanding of the movement patterns and may predict future positions, which may be utilized for threat detection. For example, if a drone is detected moving towards a restricted airspace, its exact path and speed may be tracked, and it may be determined whether it poses a threat.

The computing device 106 may render a user interface based on the classification of the identified object. For example, the computing device may render one symbol for an object identified as a bird, and another symbol for an object identified as a drone. The computing device 106 may render a separate symbol for objects yet to be identified. The computing device 106 may further update the rendered symbols based on the aggregate prioritization scores such that one or more features of the symbols indicates the calculated threat level for the identified object.

The user interface may swiftly convey the nature and urgency of potential threats to users, allowing for rapid understanding and response. When an aerial object is detected and classified (e.g., a commercial aircraft, a private drone, or a bird), the interface may display the classification through distinctive icons and color coding, e.g., blue for commercial aircraft, red for drones, and green for birds. The icons may feature vector arrows to indicate the direction and/or speed of each object, aiding quick assessment of their movement. The user interface may provide comprehensive data about each identified object including one or more of altitude, speed, and distance from critical zones. The information may be presented in a layered format within the user interface, e.g., focusing user attention by highlighting objects that pose immediate threats. For example, if a drone were to enter restricted airspace, its icon may flash red on the display, and the interface may automatically expand to provide detailed data about its trajectory and other relevant attributes.

To enhance situational awareness and threat response efficacy, the user interface may provide real-time visual data that is easy to interpret, enabling users to make informed decisions swiftly. This real-time visual data may be particularly significant in high-stress scenarios or when monitoring multiple objects. The user interface may be adaptable, catering to different user needs, such as detailed analyses for security analysts or streamlined overviews for quick decision-making by users. Users may interact with the data, adjusting display settings or zooming in on particular objects, enhancing management and response to aerial threats.

In some aspects, the computing device 106 and/or the remote server 109 may classify the identified objects based in whole or in part on the received track data from the electromagnetic device 101 independent of captured image data. For example, the computing device 106 and/or the remote server 109 may, based on the track data, determine that the relative speed or pattern of behavior of an identified object is consistent with the behavior of a bird and classify it as such.

The computing device 106 and/or the remote server 109 may utilize machine learning models applied to track data to enhance object classification, improving accuracy by learning from accumulated data over time. The machine learning models may assess characteristics such as velocity, acceleration, and/or path consistency to differentiate between various types of aerial vehicles and natural phenomena, with specific patterns used to identify unique behaviors like the erratic movements of birds versus more stable flight paths of drones or aircraft. Moreover, the one or more databases may be updated, and classification parameters may be refined as new objects and behaviors are encountered, ensuring responsiveness to emerging aerial technologies and unusual flight patterns. This continuous learning and updating may maintain classification relevance and accuracy, providing reliable data for threat assessment and/or operational decision-making.

Furthermore, by integrating track data with additional data sources such as weather conditions and flight schedules, the computing device 106 and/or the remote server 109 may make context-aware classifications that reduce false positives. For instance, an object's identification as a commercial airplane may be confirmed if it matches a scheduled flight path and timing. This integration of data may enhance safely and efficiently managing airspace, minimizing unnecessary interventions, and increasing reliability of threat assessments.

The computing device 106 and/or the remote server 109 may include an error correction module that may determine that a particular identified object is a false identification. For example, if the computing device 106 and/or the remote server 109 directs the camera to the location of an object identified by the RADAR system, and fails to identify an object in that location, the computing device 106 and/or the remote server 109 may determine that the identified object was falsely identified. The computing device 106 may update a rendered display to remove a symbol corresponding to the falsely identified object from the interface. Further, the computing device 106 may provide the user 107 with a notification or alert that the object was falsely identified. The computing device 106 may determine that an object was misidentified. The computing device 106 may update a rendered display to change a symbol corresponding to a misidentified object to a correct identification on the interface.

When the computing device 106 and/or the remote server 109 receives a radar indication of an object's presence, camera(s) 103 may be directed to the specified coordinates to visually confirm the object's existence. This dual-sensor validation approach may minimize the risk of false positives that can occur due to radar anomalies such as multipath reflections, where signals bounce off surfaces and create misleading echoes, or stealth technologies that may cause incomplete radar returns. By requiring visual confirmation from the cameras, the computing device 106 and/or the remote server 109 may ensure that only verified objects are tracked and acted upon, thereby maintaining the integrity and accuracy of the airspace monitoring process.

The error correction process may utilize one or more algorithms to analyze both radar and image data to make a determination. For example, if the camera fails to visually confirm the radar-detected object, the quality and characteristics of the radar data may be reviewed, checking for possible environmental interferences, and comparing the scenario against historical data of similar incidents. The error correction module may ascertain whether the radar detection was a false alarm or if additional factors might be obscuring the camera's view, such as poor lighting conditions or obstructions in the camera's line of sight. Furthermore, functionality of the error correction module may extend to continuous system improvement. Each false identification incident may be logged and analyzed to refine the detection algorithms and enhance sensor calibration. Over time, this refinement may lead to a decrease in false positives and an increase in the overall detection accuracy. By learning from these incidents, the computing device 106 and/or the remote server 109 may become more efficient and reduce operational burdens.

The user computing 106 and/or the remote server 109 may classify an object as an aircraft with a propeller based in whole or in part on the received RADAR data without input from the camera(s) 103. For example, the computing device 106 and/or the remote server 109 may analyze the track data to identify a particular doppler signature consistent with the motion of a propellor. The computing device 106 and/or the remote server 109 may further identify the size and/or speed of the propellor based on the doppler signature to further classify the object as an airplane, a drone, a helicopter, or other propeller-based aircraft.

The classification process used by the computing device 106 and/or the remote server 109 may utilize radar technology to detect and interpret unique Doppler signatures produced by rotating propellers on various aircraft. Shifts in frequency of the returned radar signal may be captured, which may occur due to the movement of the propeller blades. By analyzing these shifts, the computing device 106 and/or the remote server 109 may determine the presence of a propeller and may derive data regarding the rotational speed and the number of blades, which may be indicative of specific types of propeller-driven aircraft. For instance, a distinct Doppler signature of a helicopter's rotor blades, which typically rotate at a different speed compared to those of a light airplane or a drone, may be distinguished.

Further analysis may comprise correlating the identified propeller characteristics with other radar data points such as the overall velocity and altitude of the object, as well as its flight path characteristics. This comprehensive analysis may allow the computing device 106 and/or the remote server 109 to differentiate between various classes of propeller aircraft. For example, slower-moving objects at lower altitudes with consistent Doppler signatures of smaller propellers are likely to be drones or small private planes, whereas faster, higher-flying objects with larger propeller signatures might be identified as turboprop commuter airplanes or large drones used for cargo delivery. This capability may be beneficial in airspace crowded with diverse aircraft types, where quick and accurate classification may enhance threat assessment.

The computing device 106 and/or the remote server 109 may, in addition to classifying the type of an object, classify an object according to its behavior. For example, the computing device and/or the remote server may compare the received track data to one or more stored behavior patterns to determine the behavior of the object of interest. Behavioral classifications may include approaching, departing, ascending, descending, or loitering near an area of interest. The computing device 106 may render an alert or other suitable notification if a behavior is classified as a threatening behavior of some type. For example, the computing device 106 may flag an object classified as a drone hovering at a fixed location relative to the area of interest as a likely surveillance drone. The computing device 106 may alert the user 107 as to the classification of the object and allow the user to take appropriate actions to neutralize the identified threat.

According to some aspects, the computing device 106 and/or the remote server 109 may classify objects based on their behavior using advanced analytical models. This classification may include comparing track data of an object against stored behavioral patterns such as approaching, departing, ascending, descending, or loitering. For instance, a drone detected to be hovering persistently over a sensitive area may be flagged as a surveillance threat. The identification may trigger issuance of alerts or notifications, enabling the system and/or users to quickly respond to potential security breaches. Moreover, the computing device 106 and/or the remote server 109 may adapt dynamically to the observed behaviors of aerial objects within monitored airspace. For example, if an object's behavior matches a pattern classified as threatening, such as a drone loitering near critical infrastructure, the computing device 106 and/or the remote server 109 may promptly alert the users. The alerts may facilitate immediate actions to neutralize or investigate the threat, ensuring security measures are proactively enforced based on real-time data.

The integration of behavioral classification into one or more threat assessment operations may ensure that all responses are informed by a comprehensive analysis of both the nature and intent of the objects detected. By maintaining a constant feedback loop with the data received, the computing device 106 and/or the remote server 109 may continuously refine their threat detection and response strategies, improving effectiveness in managing and safeguarding the airspace. This ongoing adjustment and learning process may facilitate anticipation of potential threats before they escalate, thereby enhancing overall airspace security management.

In some aspects, the computing device 106 and/or the remote server 109 may include a process for updating prioritization scores over time. For example, the computing device 106 and/or the remote server 109 may at a predetermined interval (e.g., once per minute) recalculate prioritization scores for all identified objects in the airspace. Recalculating prioritization scores repeatedly allows for adaptable and flexible monitoring of all possible threats in an airspace. For example, an object identified as loitering around a particular location, but deemed not a threat in an initial prioritization score may become a threat if it moves towards a different location of interest, or otherwise changes its behavior. According to some aspects, the computing device 106 and/or the remote server 109 may recalculate the prioritization scores at regular intervals, such as once per minute, allowing the system to adapt to new data or changes in object behaviors and trajectories. This dynamic recalibration may maintain an accurate and timely response to evolving threats within the airspace.

The recalculated prioritization scores may take into account various factors including changes in direction, speed, and/or behavior of the objects. For instance, an aerial object initially classified as non-threatening due to its stationary position may suddenly begin to move towards a sensitive area, thereby increasing its threat level. The object's prioritization score may be adjusted based on this new behavior, ensuring that resources are appropriately reallocated to monitor this new potential threat more closely. Moreover, one or more models or algorithms may be refined based on the historical accuracy of their predictions and the outcomes of past threat engagements. By incorporating feedback mechanisms, the computing device 106 and/or the remote server 109 may learn from past incidents, enhancing the precision of future prioritization scores. This learning ability may facilitate continual improvement of threat detection capabilities, making threat detection more effective over time.

Additionally, the recalibration process may integrate external data sources such as weather conditions, which may affect the behavior of aerial objects or the operational status of different zones within an airspace. For example, if adverse weather is predicted along a flight path, the prioritization scores for objects in that path may be adjusted to reflect the increased risk of complications or erratic behavior. Accordingly, the determination of prioritization scores may adapt to internal dynamics of the airspace and/or external environmental factors.

The computing device 106 may render images and/or video data captured by one or more camera(s) 103 in real time on a user interface. The computing device 106 may further render information related to the direction of the identified object on the image and/or video data. The computing device 106 may additionally render information as to the identified prioritization score of the object, the classification of the object, and the classification of the object's behavior.

The real-time rendering capabilities of the computing device 106 may extend beyond mere visual representation, providing a comprehensive and interactive user interface that enhances situational awareness for operators. The user interface may integrate seamlessly with the aerial threat assessment system 100, displaying live images or video feeds from camera(s) 103 alongside vital data overlays that inform the operator about the nature and status of all observed objects. The information about the direction of an object, for example, may be visually encoded into the display, perhaps through arrows or lines that illustrate the object's current trajectory relative to its surroundings. This feature may be useful in high-density areas or complex situations where multiple objects may be moving in different directions, helping operators to quickly understand the dynamic environment.

Additionally, the computing device 106 may superimpose other crucial data directly onto the visual feeds, such as the prioritization score of each object. This score, which may be determined by algorithms assessing the object's potential threat based on proximity, speed, size, and other factors, may be rendered in a way that immediately draws the operator's attention to the most critical objects. Color coding, for instance, may be used where objects with a high prioritization score are highlighted in red, while less critical objects are in yellow or green, providing an intuitive method for threat assessment at a glance. The interface might also display the classification of each object, such as "commercial aircraft," "private drone," or "bird," along with specific behavioral tags like "hovering," "ascending," or "rapid movement," which may be utilized for quick decision-making by users.

The technical sophistication of the user interface, supported by the computing device 106, may ensure that all this data is not only accurately displayed but also updated in real time as new data arrives and threats evolve. Such a dynamic display may facilitate immediate and informed responses from the user, who may initiate appropriate actions such as alerting aircraft, rerouting flights, or deploying emergency protocols. The ability to provide a detailed, real-time overview of both static and moving elements within the airspace may enhance the effectiveness of the aerial threat assessment system 100, promoting safer and more efficient airspace management. This user interface may improve operational safety and contribute to the overall workflow optimization by reducing cognitive load on operators, e.g., allowing them to focus on decision-making rather than data processing.

Figure 3:
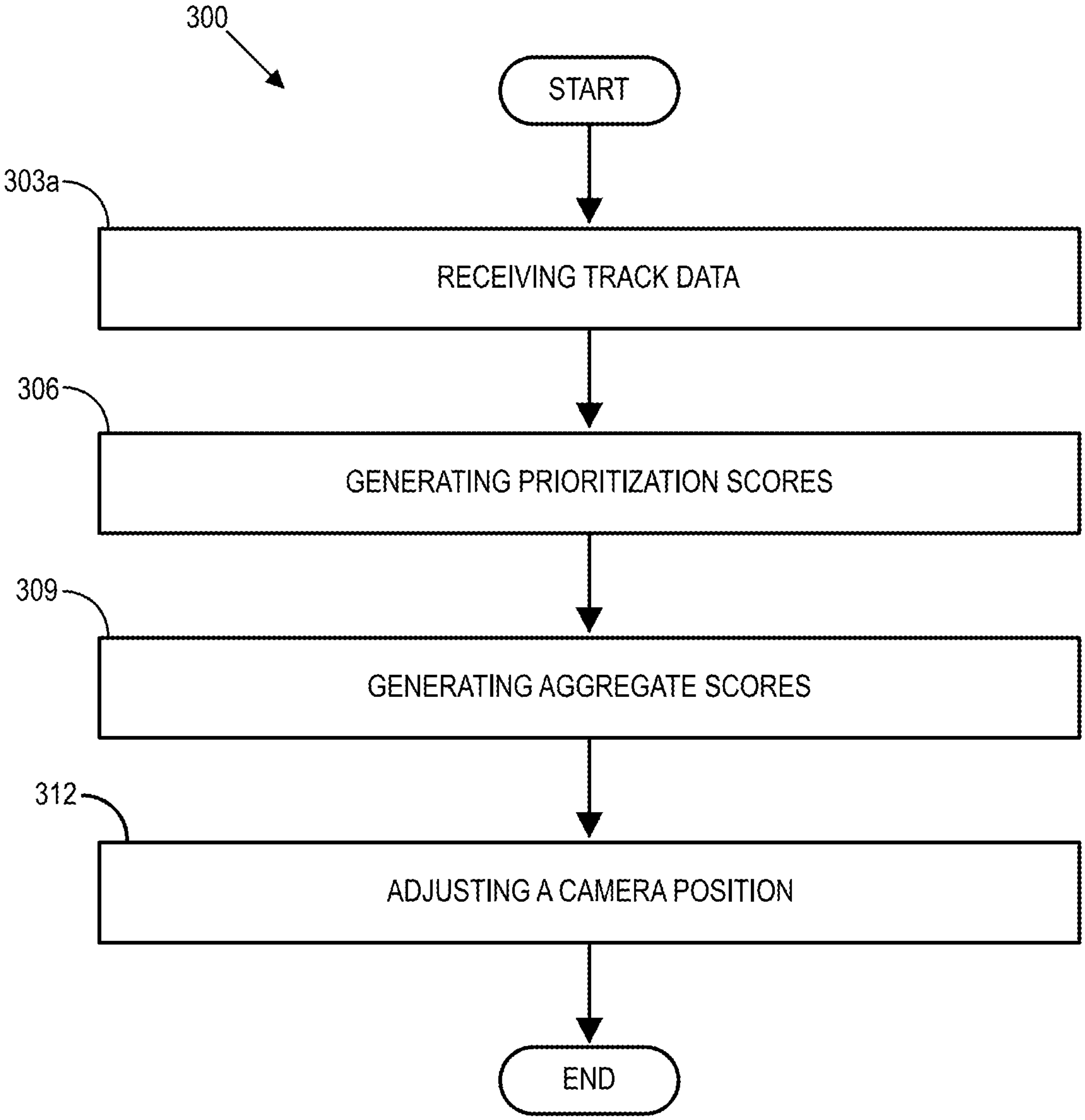
FIG. 3 illustrates an example flowchart of certain functionality implemented by portions of the networked environment according to various aspects of the present disclosure.

Referring now to FIG. 3, shown is an exemplary process 300 for identifying threats based on data from the aerial threat assessment system 100 according to various aspects of the present disclosure.

At step 303*a*, process 300 may include receiving track data. For example, the remote server 109 may receive track data from the electromagnetic device 101. Track data may include a location of an object, an estimated altitude of an object, a velocity vector of an object, an acceleration profile of an object, or other suitable information relevant for assessing the threat level of an object. Track data may include historical data corresponding to the movement of an object in a preconfigured period of time. For example, track data may include locations of the object sampled every minute for the previous hour or every second for the last five minutes.

At step 306, process 300 may include generating prioritization scores. For example, the remote server 109 may generate prioritization scores based on track data received from the aerial threat assessment system 100. The remote server 109 may compute prioritization scores based on the proximity of identified objects to the sensor array 209 or to an alternative location of interest. For example, the remote server 109 may generate a high priority score for objects closer to the location of interest. The remote server 109 may generate prioritization scores based on the velocity of identified objects. For example, the remote server 109 may generate high priority scores for objects moving at high velocity towards a location of interest. The remote server 109 may generate prioritization scores based on the direction of approach of an object of interest. For example, the remote server 109 may assign high prioritization scores to objects approaching from areas associated with known sources of threats.

At step 309, process 300 may include generating aggregate scores. For example, the remote server 109 may generate aggregate scores based on the previously generated prioritization scores. The remote server 109 may apply weights to each individually generated prioritization score and compute the aggregate score as a weighted sum of individual prioritization scores. The remote server 109 may automatically determine the weights based on historical data, or users may assign specific weights to suit user preferences. The computing device 106 may display aggregate scores for viewing by the user. For example, the computing device 106 may render symbols of different colors based on the aggregate scores. The computing device 106 may render symbols for objects with high aggregate scores in red, and low aggregate scores in green to indicate that high aggregate scores represent objects of more significant threat level based on the received track data.

At step 312, process 300 may include adjusting a camera position. For example, the remote server 109 may communicate an adjustment of the camera position to the camera(s) 103. The remote server 109 may adjust the position of the camera such that it points towards the object with the highest aggregate score. The remote server 109 may further adjust the camera position allowing it to lock onto the object of interest. The camera(s) 103 may follow the object along its flight path until the object may be properly classified by the user.

Figure 4:
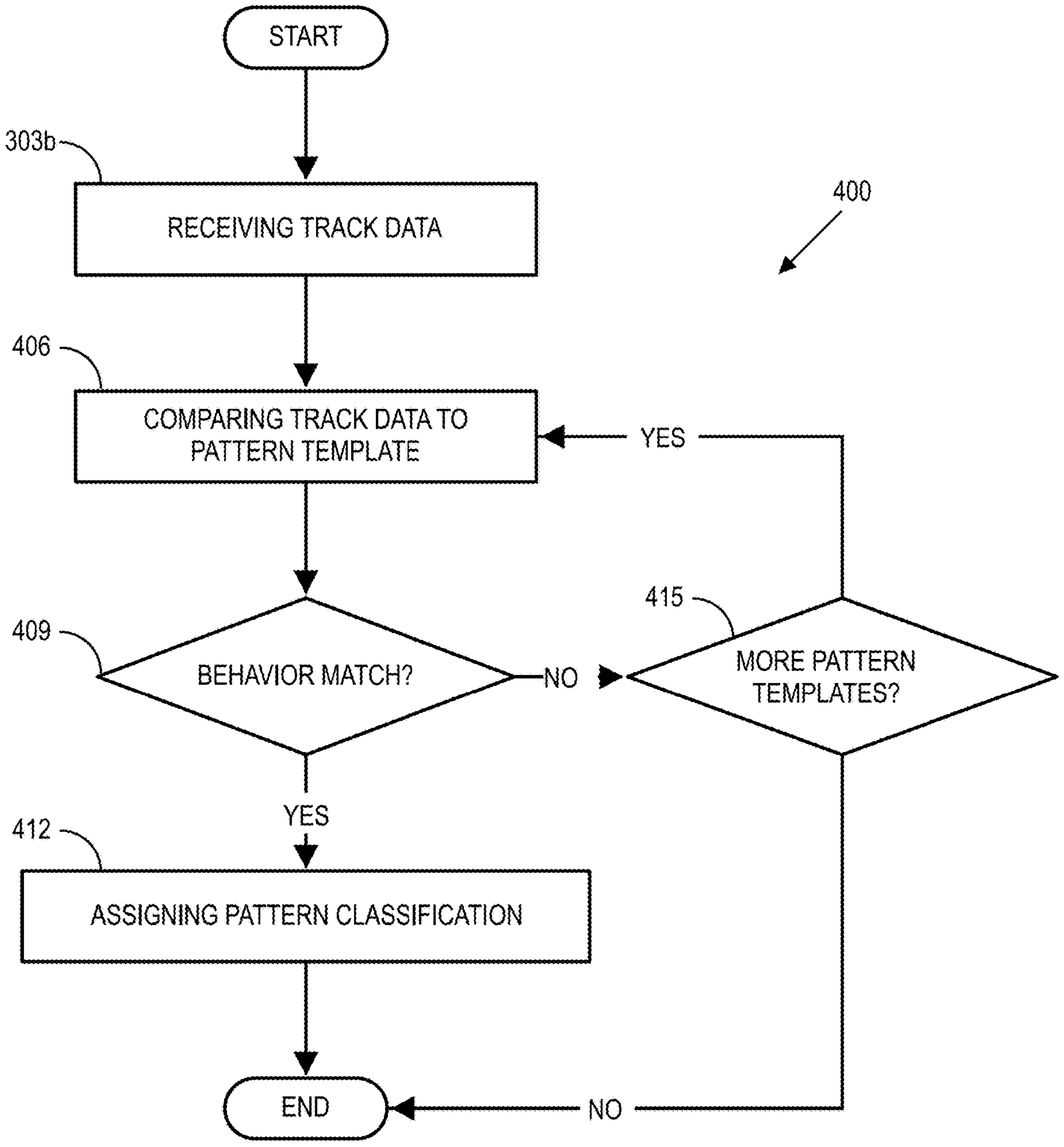
FIG. 4 illustrates an example flowchart of certain functionality implemented by portions of the networked environment according to various aspects of the present disclosure.

Referring now to FIG. 4, shown is a process 400 for classifying the behavior of identified objects according to various aspects of the present disclosure.

At step 303*b*, process 400 may include receiving track data. For example, the remote server 109 may receive track data from the electromagnetic device 101. Track data may include complex trajectories corresponding to the movement of an identified object. For example, track data may include a shape of a trajectory, a velocity of a trajectory, timing information related to the trajectory, or other relevant information. Track data may correspond to a single identified object or multiple objects moving in coordinated fashion.

At step 406, process 400 may include comparing track data to a pattern template. For example. The remote server 109 may compare the received track data to a stored pattern template. The remote server 109 may include multiple pattern templates corresponding to various classes of behavior for objects. Behavior classes may include loitering, approaching, departing, circling, and other relevant behavior classes. It is desirable to classify behavior of identified aerial objects 115 to allow users to identify which objects are threats based on their behavior. For example, an object rapidly approaching an area of interest may require a different course of action compared to an object loitering in an area of interest. The remote server 109 may compare received track data to a pattern template by computing a similarity metric between the received track data and the pattern template. For example, the remote server 109 may compute a point-by-point distance metric between the pattern template and the received track data. In some aspects, the remote server 109 may compute a cosine similarity metric, or other similarity metric between the received track data and the pattern template.

Comparing track data to a pattern template may include a process of training machine learning models based on historical data. For example, the remote server 109 may include a database of videos of previously identified objects in the airspace. The remote server 109 may classify these videos into distinct sets of behaviors in a supervised or unsupervised manner. For example, the remote server 109 may apply an unsupervised clustering algorithm (e.g., k-means clustering, nearest neighbor clustering, or other suitable clustering algorithms) to determine a set of common behavior patterns for identified objects in the airspace. In some aspects, the remote server 109 may incorporate manually generated labels of particular behaviors to define a set of behavior classes. For example, the remote server 109 may incorporate manually labeled videos of loitering, approaching, departing, ascending, and descending behaviors as exemplary videos of a preconfigured set of classes. The remote server 109 may include a process for training a machine learning model. For example, the remote server 109 may partition historical data into a training and testing set, wherein the training set consists of video and track data for identified objects and corresponding behavior labels. The testing set may consist of video and track data without behavior labels. The remote server 109 may optimize a classification algorithm such that the error between the algorithm's classification and a ground truth classification is minimized. Optimization approaches may include gradient descent, genetic algorithms, least squares regression, or other suitable optimization approaches. Classification algorithms may include nearest neighbor, random forest, neural networks, or other suitable classification algorithms. The remote server 109 may apply the optimized machine learning algorithm to the testing set to determine an accuracy level of the algorithm. The remote server 109 may repeat the process of optimizing the machine learning algorithm iteratively until a threshold accuracy level is reached. In some aspects, the remote server 109 may assign classification scores to particular behaviors. Rather than classifying a particular object into a particular class of behavior, the remote server 109 may assign probability scores to a set of behavioral classes. For example, the remote server 109 may identify an object loitering in an air space, but making periodic departures, and assign a probability score to the loitering class of behaviors and to the departing class of behaviors (e.g., 70% loitering, 30% departing). The remote server 109 may include variability metrics or standard deviations with its assigned probability scores, allowing users to have an estimate of any error in the estimation.

At step 409, process 400 may include determining whether the received track matches the behavior associated with the pattern template. For example, the remote server 109 may determine whether the received track data matches the pattern template. In some aspects, the remote server 109 may compare a computed similarity metric to a threshold value. If the similarity value is above the threshold, the remote server 109 may determine that the observed behavior matches the pattern template. If not, the remote server 109 may proceed to step 415.

If the received track data matches the pattern template, at step 412, process 400 may include assigning a pattern classification. For example, the remote server 109 may assign and store a classification for the behavior of the object of interest. The remote server may transmit the assigned classification to the computing device 106 via the network 112. The computing device 106 may render a symbol or other indication of the classified behavior on the user interface 201 to allow the user to take appropriate action. The remote server 109 and/or the computing device 106 may automatically take action in response to a particular classification of behavior. For example, if the behavior of an object that has been deemed a high threat is determined to be a loitering behavior, the remote server 109 or computing device 106 may issue commands to take action to disable the loitering object.

At step 415, process 400 may include checking for more pattern templates. For example, the remote server 109 may check for more pattern templates. The remote server 109 may query a locally or remotely stored database for additional pattern templates for comparison. The remote server 109 may constantly update the stored set of behavior pattern templates based on newly received data. If the remote server identifies additional behavior templates for comparison, the remote server may repeat steps 403-409 with the new template(s) until a suitable classification is reached. The remote server 109 may continuously update the behavior classification for a particular object over time. For example, the remote server 109 may reclassify an object that was initially classified as loitering around an area that then departed to a different area as a departing object. In some aspects, the remote server 109 may determine prioritization scores and corresponding threat levels for objects based on sequences of behaviors. For example, by comparing a sequence of behaviors for a particular object to an historical database of the behavior patterns of known threats, the remote server 109 may determine that an object previously classified as a non-threatening hovering object may be a threatening object if its behavior changes. In one embodiment, the remote server 109 may classify a sequence of behaviors that includes approaching, loitering around an area, and departing at regular intervals as a surveillance sequence. The remote server 109 may assign a high prioritization score to an object engaging in a known threatening sequence of behaviors to allow camera resources to be deployed towards that object with more regularity. The computing device 106 may render an alert or other communicative element to the user 107 to inform the user 107 of the identified sequence of behaviors. In some aspects, the remote server 109 and/or the computing device 106 may automatically deploy defensive mechanisms towards objects identified as engaging in a particular sequence of behaviors. For example, the remote server 109 and/or the computing device 106 may attempt to disable an object identified as engaging in adversarial surveillance.

Figure 5:
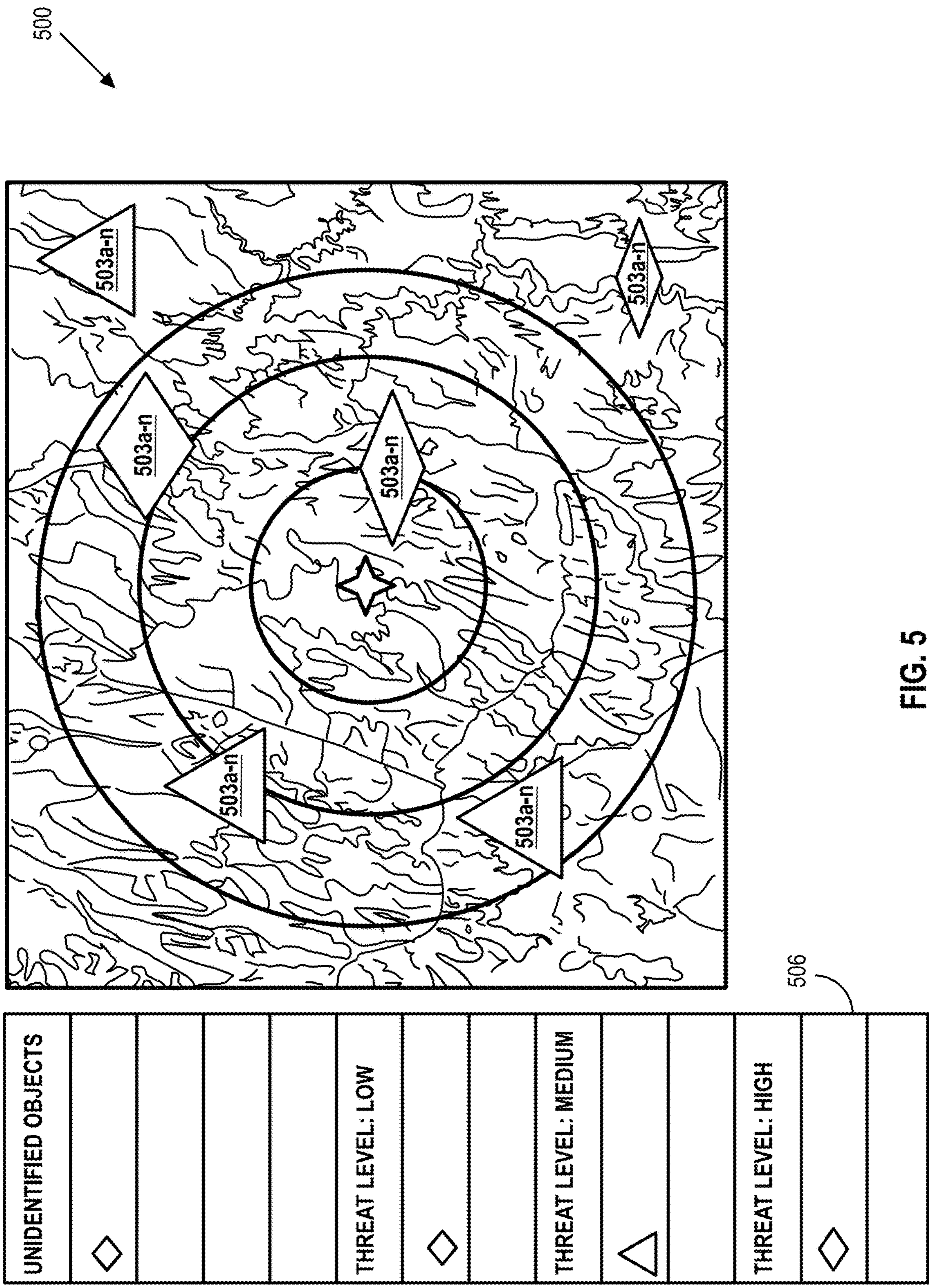
FIG. 5 illustrates an example user interface corresponding to a portion of the functionality implemented by portions of the networked environment according to various aspects of the present disclosure.

Referring now to FIG. 5, shown is an exemplary user interface 500 in accordance with various aspects of the present disclosure.

The computing device 106 may render the user interface 500 to allow the user to view and interact with data corresponding to identified objects in the airfield. The user interface 500 may include a map widget 501 of the airspace of interest. For example, the computing device 106 may render a stored map of an area, a real-time satellite feed, or other suitable representation of the area of interest. The map widget 501 may include multiple selectable views, including a satellite view, a map view, a topographical view, or other relevant view. The computing device 106 may allow users 107 to toggle between different views depending on their preference.

The user interface 500 may include symbols 503 corresponding to detected objects in the airspace. The computing device 106 may render symbols of different shapes, colors, or other features to denote the threat classification of the identified object. For example, the computing device 106 may render one symbol (e.g., a grey diamond) for objects yet to be classified, and another symbol (e.g., a red diamond) for objects classified as high threat. The computing device 106 may update the symbols in real time upon receiving classification data from the remote server 109.

The user interface 500 may include a list widget 506 for listing all identified objects in the airspace. For example, the computing device 106 may render a list of all objects identified in the airspace. The list widget 506 may include information related to the classification of objects and their relative threat levels as determined by their aggregate prioritization scores. The list widget 506 may include symbols 503 which correspond to the symbols 503 rendered on the map widget 501 to allow users to easily identify the location of objects of interest. The user interface 500 may further render real-time images or video captured by the camera(s) 103 to allow users 107 to directly view image data.

From the foregoing, it will be understood that various aspects of the processes described herein are software processes that execute on computer systems that form parts of the system. Accordingly, it will be understood that various aspects of the system described herein are generally implemented as specially configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media may be any available media which may be accessed by a computer, or downloadable through communication networks. By way of example, and not limitation, such computer-readable media may comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which may be used to carry or store computer program code in the form of computer-executable instructions or data structures and which may be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the aspects of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device, or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

Clause 1. A system, comprising: a memory; and at least one computing device in communication with the memory, the at least one computing device being configured to: receive data describing a plurality of tracks individually corresponding to one of a plurality of identified objects from a radar system corresponding to a particular airspace, wherein the data describing the plurality of tracks comprises machine-learning metadata; generate a plurality of sets of prioritization scores individually corresponding to the plurality of tracks; generate a plurality of aggregate prioritization scores individually corresponding to the plurality of tracks based on the plurality of sets of prioritization scores; and adjust a positioning of at least one PTZ camera based on the plurality of aggregate prioritization scores.

Clause 2. The system of clause 1 or any other clause herein, wherein generating the plurality of sets of prioritization scores comprises applying a plurality of different machine learning algorithms to the data describing the plurality of tracks.

Clause 3. The system of clause 2 or any other clause herein, wherein the plurality of different machine learning algorithms comprises at least one random forest classifier algorithm.

Clause 4. The system of clause 1 or any other clause herein, wherein the at least one computing device is further configured to generate a particular aggregate prioritization score of the plurality of aggregate prioritization scores as a weighted average of a particular set of prioritization scores of the plurality of sets of prioritization scores.

Clause 5. The system of clause 1 or any other clause herein, wherein the at least one computing device is further configured to perform image analysis on at least one feed from the at least one PTZ camera to determine at least one respective type of at least one of the plurality of identified objects.

Clause 6. The system of clause 5 or any other clause herein, wherein the at least one computing device is further configured to render an updated user interface comprising at least one respective symbol corresponding to the at least respective type.

Clause 7. The system of clause 1 or any other clause herein, wherein the data describing the plurality of tracks comprises machine-learning metadata corresponding to the radar system.

Clause 8. A method, comprising: receiving, via one of one or more computing devices, data describing a plurality of tracks individually corresponding to one of a plurality of identified objects from a radar system corresponding to a particular airspace; generating, via one of the one or more computing devices, a plurality of sets of prioritization scores individually corresponding to the plurality of tracks; generating, via one of the one or more computing devices, a plurality of aggregate prioritization scores individually corresponding to the plurality of tracks based on the plurality of sets of prioritization scores; and adjusting, via one of the one or more computing devices, a positioning of at least one PTZ camera based on the plurality of aggregate prioritization scores.

Clause 9. The method of clause 8 or any other clause herein, further comprising determining, via one of the one or more computing devices, a classification of at least one of the plurality of identified objects based on the data describing the plurality of tracks.

Clause 10. The method of clause 8 or any other clause herein, wherein adjusting the positioning further comprises adjusting a particular PTZ camera of the at least one PTZ camera to point at a particular object based on the plurality of aggregate prioritization scores.

Clause 11. The method of clause 10 or any other clause herein, further comprising determining, via one of the one or more computing devices, that the particular object of the plurality of identified objects corresponds to a false identification based on data from the particular PTZ camera.

Clause 12. The method of clause 8 or any other clause herein, wherein the data describing the plurality of tracks comprises machine-learning metadata.

Clause 13. The method of clause 8 or any other clause herein, further comprising determining, via one of the one or more computing devices, that a particular identified object of the plurality of identified objects comprises a propeller based on analyzing the data describing the plurality of tracks to identify a particular Doppler signature.

Clause 14. A non-transitory computer-readable medium embodying a program that, when executed by at least one computing device, causes the at least one computing device to: receive data describing a plurality of tracks individually corresponding to one of a plurality of identified objects from a radar system corresponding to a particular airspace; generate a plurality of sets of prioritization scores individually corresponding to the plurality of tracks; generate a plurality of aggregate prioritization scores individually corresponding to the plurality of tracks based on the plurality of sets of prioritization scores; and adjust a positioning of at least one PTZ camera based on the plurality of aggregate prioritization scores.

Clause 15. The non-transitory computer-readable medium of clause 14 or any other clause herein, wherein the program further causes the at least one computing device to generate a classification for at least a subset of the plurality of identified objects.

Clause 16. The non-transitory computer-readable medium of clause 14 or any other clause herein, wherein the program further causes the at least one computing device to monitor a particular identified object of the plurality of identified objects based on the plurality of aggregate prioritization scores.

Clause 17. The non-transitory computer-readable medium of clause 16 or any other clause herein, wherein the program further causes the at least one computing device to: generate a comparison of track data for the particular identified object to a plurality of behavior patterns; determine a movement pattern of the particular identified object matches a particular pattern of the plurality of behavior patterns based on the comparison; and modify a particular aggregate prioritization score of the plurality of aggregate prioritization scores corresponding to the particular identified object based on the movement pattern matching the particular pattern.

Clause 18. The non-transitory computer-readable medium of clause 17 or any other clause herein, wherein the plurality of behavior patterns comprise at least one of: a track with a trajectory toward a point of interest, a track for an object within a set distance from a point of interest, a track for an object moving within a particular zone associated with an area of interest, or a track for an object hovering at a specific altitude.

Clause 19. The non-transitory computer-readable medium of clause 17 or any other clause herein, wherein the particular aggregate prioritization score is modified by recalculating a particular prioritization score of a particular set of prioritization scores that corresponds to the particular identified object from the plurality of sets of prioritization scores.

Clause 20. The non-transitory computer-readable medium of clause 14 or any other clause herein, wherein the program further causes the at least one computing device to: render the at least one PTZ camera on a user interface comprising directional information; and update the directional information on the user interface based on the adjustment of the positioning.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

What is claimed is:

1. A system, comprising:

a memory; and at least one computing device in communication with the memory, the at least one computing device being configured to:

train a plurality of different machine learning algorithms individually corresponding to a different type of machine learning algorithm;

receive data describing a plurality of tracks individually corresponding to one of a plurality of identified objects from a radar system corresponding to a particular airspace, wherein the data describing the plurality of tracks comprises machine-learning metadata;

determine information about the particular airspace;

generate a plurality of sets of prioritization scores by:

generating a first set of prioritization scores of the plurality of sets of prioritization scores by applying a first machine learning model of the plurality of different machine learning algorithms to the data describing the plurality of tracks; and generating a second set of prioritization scores of the plurality of sets of prioritization scores by applying a second machine learning model of the plurality of different machine learning algorithms to the data describing the plurality of tracks, wherein each of the plurality of sets of prioritization scores is generated by a different one of the plurality of different machine learning algorithms;

generate a plurality of aggregate prioritization scores individually corresponding to the plurality of tracks based on an adjusted weighting of the plurality of sets of prioritization scores, wherein the adjusted weighting of the plurality of sets of prioritization scores is determined based on the information about the particular airspace; and adjust a positioning of at least one pan-tilt-zoom (PTZ) camera based on the plurality of aggregate prioritization scores.

2. The system of claim 1, wherein the plurality of different machine learning algorithms comprises at least one random forest classifier algorithm.

3. The system of claim 1, wherein the at least one computing device is further configured to generate a particular aggregate prioritization score of the plurality of aggregate prioritization scores as a weighted average of a particular set of prioritization scores of the plurality of sets of prioritization scores.

4. The system of claim 1, wherein the at least one computing device is further configured to perform image analysis on at least one feed from the at least one PTZ camera to determine at least one respective type of at least one of the plurality of identified objects.

5. The system of claim 4, wherein the at least one computing device is further configured to render an updated user interface comprising at least one respective symbol corresponding to the at least respective type.

6. The system of claim 1, wherein the data describing the plurality of tracks comprises machine-learning metadata corresponding to the radar system.

7. The system of claim 1, further comprising a PIR sensor, wherein the data describing the plurality of tracks comprises data from the PIR sensor.

8. The system of claim 1, wherein the at least one computing device is further configured to exclude a particular one of the plurality of sets of prioritization scores based on the information about the particular airspace.

9. A method, comprising:

training, via one or more computing devices, a plurality of different machine learning algorithms individually corresponding to a different type of machine learning algorithm;

receiving, via the one or more computing devices, data describing a plurality of tracks individually corresponding to one of a plurality of identified objects from a radar system corresponding to a particular airspace;

determining, via the one or more computing devices, information about the particular airspace;

generating, via the one or more computing devices, a plurality of sets of prioritization scores individually corresponding to the plurality of tracks, wherein each set of the plurality of sets of prioritization scores is generated by applying a different machine learning model of the plurality of different machine learning algorithms to the data describing the plurality of tracks;

generating, via the one or more computing devices, a plurality of aggregate prioritization scores individually corresponding to the plurality of tracks based on an adjusted weighting of the plurality of sets of prioritization scores, wherein the adjusted weighting of the plurality of sets of prioritization scores is determined based on the information about the particular airspace; and adjusting, via the one or more computing devices, a positioning of at least one pan-tilt-zoom (PTZ) camera based on the plurality of aggregate prioritization scores.

10. The method of claim 9, further comprising determining, via the one or more computing devices, a classification of at least the plurality of identified objects based on the data describing the plurality of tracks.

11. The method of claim 9, wherein adjusting the positioning further comprises adjusting a particular PTZ camera of the at least one PTZ camera to point at a particular object based on the plurality of aggregate prioritization scores.

12. The method of claim 11, further comprising determining, via the one or more computing devices, that the particular object of the plurality of identified objects corresponds to a false identification based on data from the particular PTZ camera.

13. The method of claim 9, wherein the data describing the plurality of tracks comprises machine-learning metadata.

14. The method of claim 9, further comprising determining, via the one or more computing devices, that a particular identified object of the plurality of identified objects comprises a propeller based on analyzing the data describing the plurality of tracks to identify a particular Doppler signature.

15. A non-transitory computer-readable medium embodying a program that, when executed by at least one computing device, causes the at least one computing device to:

train a plurality of different machine learning algorithms individually corresponding to a different type of machine learning algorithm;

receive data describing a plurality of tracks individually corresponding to one of a plurality of identified objects from a radar system corresponding to a particular airspace;

determine information about the particular airspace;

generate a plurality of sets of prioritization scores by:

generating a first set of prioritization scores of the plurality of sets of prioritization scores by applying a first machine learning model of the plurality of different machine learning algorithms to the data describing the plurality of tracks; and generating a second set of prioritization scores of the plurality of sets of prioritization scores by applying a second machine learning model of the plurality of different machine learning algorithms to the data describing the plurality of tracks, wherein each of the plurality of sets of prioritization scores is generated by a different one of the plurality of different machine learning algorithms;

generate a plurality of aggregate prioritization scores individually corresponding to the plurality of tracks based on an adjusted weighting of the plurality of sets of prioritization scores, wherein the adjusted weighting of the plurality of sets of prioritization scores is determined based on the information about the particular airspace; and adjust a positioning of at least one pan-tilt-zoom (PTZ) camera based on the plurality of aggregate prioritization scores.

16. The non-transitory computer-readable medium of claim 15, wherein the program further causes the at least one computing device to monitor a particular identified object of the plurality of identified objects based on the plurality of aggregate prioritization scores.

17. The non-transitory computer-readable medium of claim 16, wherein the program further causes the at least one computing device to:

generate a comparison of track data for the particular identified object to a plurality of behavior patterns;

determine a movement pattern of the particular identified object matches a particular pattern of the plurality of behavior patterns based on the comparison; and modify a particular aggregate prioritization score of the plurality of aggregate prioritization scores corresponding to the particular identified object based on the movement pattern matching the particular pattern.

18. The non-transitory computer-readable medium of claim 17, wherein the plurality of behavior patterns comprise at least one of: a track with a trajectory toward a point of interest, a track for an object within a set distance from a point of interest, a track for an object moving within a particular zone associated with an area of interest, or a track for an object hovering at a specific altitude.

19. The non-transitory computer-readable medium of claim 17, wherein the particular aggregate prioritization score is modified by recalculating a particular prioritization score of a particular set of prioritization scores that corresponds to the particular identified object from the plurality of sets of prioritization scores.

20. The non-transitory computer-readable medium of claim 15, wherein the program further causes the at least one computing device to:

render the at least one PTZ camera on a user interface comprising directional information; and update the directional information on the user interface based on the adjustment of the positioning.

* * * * *